(12) United States Patent
Cao (10) Patent No.: US 11,800,337 B2
(45) Date of Patent: Oct. 24, 2023

(54) METHOD AND APPARATUS FOR ESTABLISHING BLUETOOTH DATA CHANNEL

(71) Applicant: HUAWEI TECHNOLOGIES CO., LTD., Shenzhen (CN)

(72) Inventor: Cong Cao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 37 days.

(21) Appl. No.: 17/383,717

(22) Filed: Jul. 23, 2021

(65) Prior Publication Data

US 2021/0352458 A1 Nov. 11, 2021

Related U.S. Application Data

(63) Continuation of application No. PCT/CN2019/073207, filed on Jan. 25, 2019.

(51) Int. Cl.
*H04W 4/80* (2018.01)
*H04W 76/10* (2018.01)
*H04W 28/18* (2009.01)

(52) U.S. Cl.
CPC ............. *H04W 4/80* (2018.02); *H04W 28/18* (2013.01); *H04W 76/10* (2018.02)

(58) Field of Classification Search
CPC ........ H04W 4/80; H04W 76/10; H04W 28/18
See application file for complete search history.

(56) References Cited

U.S. PATENT DOCUMENTS

| 9,930,477 B2 | 3/2018 | Song |
| 2013/0029596 A1 | 1/2013 | Preston et al. |
| 2016/0345376 A1 | 11/2016 | Xianwei et al. |
| 2016/0359925 A1 | 12/2016 | Song |
| 2018/0213395 A1* | 7/2018 | Choi ...................... H04W 76/14 |

FOREIGN PATENT DOCUMENTS

| CN | 104394600 | * | 3/2015 | .............. H04W 4/80 |
| CN | 104394600 A | | 3/2015 | |
| CN | 104469665 A | | 3/2015 | |
| CN | 105227418 A | | 1/2016 | |
| CN | 106612445 A | | 5/2017 | |
| CN | 108270554 A | | 7/2018 | |
| EP | 3550888 A1 | | 10/2019 | |
| WO | 2018113086 A1 | | 6/2018 | |

* cited by examiner

*Primary Examiner* — Tuan H Nguyen
(74) *Attorney, Agent, or Firm* — Rimon PC (57) ABSTRACT

A method and an apparatus for establishing a Bluetooth data channel are provided. In the method, before starting a service in a first mode, a first communications apparatus negotiates with a second communications apparatus to determine a first parameter. The first parameter may be used for establishing a data channel between the first communications apparatus and the second communications apparatus. After starting the service in the first mode, the first communications apparatus sends a first message to the second communications apparatus. The first message is used to request the second communications apparatus to establish the data channel based on the first parameter. According to the foregoing method, before starting the service in the first mode, the first communications apparatus negotiates with the second communications apparatus to determine the first parameter.

12 Claims, 6 Drawing Sheets

METHOD AND APPARATUS FOR ESTABLISHING BLUETOOTH DATA CHANNEL

CROSS-REFERENCE TO RELATED APPLICATIONS

This application is a continuation of International Application No. PCT/CN2019/073207, filed on Jan. 25, 2019, which is hereby incorporated by reference in its entirety.

TECHNICAL FIELD

This application relates to the field of Bluetooth technologies, and in particular, to a method and an apparatus for establishing a Bluetooth data channel.

BACKGROUND

With the continuous evolution of a Bluetooth protocol, a Bluetooth low energy (BLE) service tends to replace a conventional Bluetooth service in all aspects, especially in an audio field. A future protocol draft of the Bluetooth special interest group (SIG) has proposed a BLE isochronous channel (ISO) solution, which is a technical solution applied to the BLE service. An ISO is a data path established based on an asynchronous connection-oriented logical transport (ACL).

Currently, after the BLE service starts, three handshakes need to be performed between Bluetooth devices based on a BLE ACL in a process of establishing the ISO. The first two handshakes are used to negotiate a parameter required by the BLE service between the Bluetooth devices. The third handshake is used to establish a connected isochronous stream (CIS) channel between the Bluetooth devices. Then BLE service data is transmitted through the CIS channel.

The foregoing process of establishing the ISO after the BLE service starts takes a very long period of time, causing a high delay in a current BLE service.

SUMMARY

Embodiments of this application provide a method and an apparatus for establishing a Bluetooth data channel, to resolve a current technical problem that a BLE service delay is excessively high because of an excessively long process of establishing an ISO after a BLE service starts.

According to a first aspect, this application provides a method for establishing a Bluetooth data channel. According to the method, before starting a service in a first mode, a first communications apparatus negotiates with a second communications apparatus to determine a first parameter. The first parameter may be used for establishing a data channel between the first communications apparatus and the second communications apparatus, and the data channel is used to transmit Bluetooth data of the first mode. After starting the service in the first mode, the first communications apparatus sends a first message to the second communications apparatus. The first message is used to request the second communications apparatus to establish the data channel based on the first parameter.

According to the foregoing method, before starting the service in the first mode, the first communications apparatus negotiates with the second communications apparatus to determine the first parameter, and there is no need to negotiate the first parameter after the service in the first mode is started. Therefore, time consumed between starting the service in the first mode and establishing the data channel may be reduced in a BLE service, to decrease a BLE service delay. Specifically, the first mode may be an audio mode, and the foregoing related service may be an audio service. The audio mode may be related to quality of Bluetooth data of the audio service. For example, audio services may be classified into different modes based on the quality of the Bluetooth data. In addition, the first mode may alternatively refer to a video service or another type of service.

In a possible design, when negotiating with the second communications apparatus to determine the first parameter, the first communications apparatus may send a second message to the second communications apparatus. The second message is used to request to negotiate a parameter used when the Bluetooth data of the first mode is transmitted between the first communications apparatus and the second communications apparatus. The first communications apparatus receives a third message sent by the second communications apparatus. The third message is used to determine the first parameter. In this design, the first communications apparatus may negotiate, by using the second message and the third message, with the second communications apparatus to determine the first parameter.

In a possible design, the second message may be specifically used to indicate at least one parameter. The at least one parameter includes the first parameter. The third message may be specifically used to indicate that the second communications apparatus agrees to establish the data channel based on the first parameter.

In a possible design, the second message may further be used to request to negotiate a parameter used when Bluetooth data of a second mode is transmitted between the first communications apparatus and the second communications apparatus, and the third message may further be used to determine a second parameter. The second parameter is used for transmitting the Bluetooth data of the second mode between the first communications apparatus and the second communications apparatus. Specifically, the second message may further be used to indicate the at least one parameter. The at least one parameter includes the second parameter. The third message is specifically used to indicate that the second communications apparatus agrees to establish the data channel based on the second parameter.

In a possible design, the second message may further be used to request to negotiate a parameter used when Bluetooth data of a third mode is transmitted between the first communications apparatus and the second communications apparatus, and the third message may further be used to determine a third parameter. The third parameter is used for transmitting the Bluetooth data of the third mode between the first communications apparatus and the second communications apparatus. Specifically, the second message may further be used to indicate the at least one parameter. The at least one parameter includes the third parameter. The third message is specifically used to indicate that the second communications apparatus agrees to establish the data channel based on the third parameter.

In a possible design, the second message may be an L2CAP message. In this design, the first communications apparatus may negotiate with the second communications apparatus by using the L2CAP message to determine a parameter used when Bluetooth data of one or more modes is transmitted. In implementation, the third message may also be an L2CAP message.

In a possible design, the first mode may be any one of a high-quality music mode, a normal-quality music mode, or a voice mode. In addition, the first mode, the second mode, and the third mode each in this application may be one of the high-quality music mode, the normal-quality music mode, or the voice mode.

In addition, if the method for establishing a Bluetooth data channel provided in this application is implemented by a second communications apparatus, the second communications apparatus may negotiation with a first communications apparatus to determine the first parameter before the first communications apparatus starts the service in the first mode. The first parameter may be used for establishing the data channel between the first communications apparatus and the second communications apparatus, and the data channel is used to transmit the Bluetooth data of the first mode. After the first communications apparatus starts the service in the first mode, the second communications apparatus may receive the first message from the first communications apparatus. The first message is used to request the second communications apparatus to establish the data channel.

In a possible design, when negotiating with the first communications apparatus to determine the first parameter, the second communications apparatus may receive the second message from the first communications apparatus. The second message is used to request to negotiate the parameter used when the Bluetooth data of the first mode is transmitted between the first communications apparatus and the second communications apparatus. Then, the second communications apparatus may send the third message to the first communications apparatus. The third message is used to determine the first parameter. In this design, the first communications apparatus and the second communications apparatus may determine the first parameter according to the second message and the third message.

In a possible design, the second message may be used to indicate the at least one parameter. The at least one parameter includes the first parameter. The third message may be specifically used to indicate that the second communications apparatus agrees to establish the data channel based on the first parameter.

In a possible design, the second message may further be used to request to negotiate the parameter used when the Bluetooth data of the second mode is transmitted between the first communications apparatus and the second communications apparatus, and the third message may further be used to determine the second parameter. The second parameter is used for transmitting the Bluetooth data of the second mode between the first communications apparatus and the second communications apparatus. Specifically, the second message may further be used to indicate the at least one parameter. The at least one parameter includes the second parameter. The third message is specifically used to indicate that the second communications apparatus agrees to establish the data channel based on the second parameter.

In a possible design, the second message may further be used to request to negotiate the parameter used when the Bluetooth data of the third mode is transmitted between the first communications apparatus and the second communications apparatus, and the third message may further be used to determine the third parameter. The third parameter is used for transmitting the Bluetooth data of the third mode between the first communications apparatus and the second communications apparatus. Specifically, the second message may further be used to indicate the at least one parameter. The at least one parameter includes the third parameter. The third message is specifically used to indicate that the second communications apparatus agrees to establish the data channel based on the third parameter.

In a possible design, the second message may be the L2CAP message.

In a possible design, the first mode may be any one of the high-quality music mode, the normal-quality music mode, or the voice mode. In addition, the first mode, the second mode, and the third mode each in this application may be one of the high-quality music mode, the normal-quality music mode, or the voice mode.

According to a second aspect, an embodiment of this application provides a communications apparatus, configured to implement the method for establishing a Bluetooth data channel provided in the first aspect or any possible design of the first aspect. The communications apparatus may have a function of the first communications apparatus and/or the second communications apparatus in the method example of the first aspect when the first communications apparatus and/or the second communications apparatus performs the method for establishing a Bluetooth data channel that is provided in the embodiments of this application. The function may be implemented by hardware, or may be implemented by hardware executing corresponding software. The hardware or software includes one or more modules corresponding to the foregoing functions.

In a possible design, the communications apparatus may include a first negotiation unit and a first message sending unit. These units may perform corresponding functions of the first communications apparatus in the example of the method for establishing a Bluetooth data channel provided in the first aspect or any possible design of the first aspect. For details, refer to the detailed description in the method example. Details are not described herein again.

In a possible design, the communications apparatus may include a second negotiation unit and a first message receiving unit. These units may perform corresponding functions of the second communications apparatus in the example of the method for establishing a Bluetooth data channel provided in the first aspect or any possible design of the first aspect. For details, refer to the detailed description in the method example. Details are not described herein again.

In another possible design, a structure of the communications apparatus may include a transceiver, a memory, and a processor. The processor, the memory, and the transceiver may be connected by using a bus or another medium. The transceiver may be used by the communications apparatus for communication. The memory may be configured to store a computer program. The processor may be configured to invoke the computer program stored in the memory, to perform corresponding functions in the example of the method for establishing a Bluetooth data channel provided in the first aspect or any possible design of the first aspect.

According to a third aspect, an embodiment of this application further provides a computer-readable storage medium. The computer-readable storage medium stores a computer program, and when the program is executed by a processor, a computer is enabled to perform the method according to the first aspect or any possible design of the first aspect.

According to a fourth aspect, an embodiment of this application further provides a computer program product. The computer program product stores instructions, and when the instructions are run on a computer, the computer is enabled to perform the method according to the first aspect or any possible design of the first aspect.

According to a fifth aspect, an embodiment of this application provides a chip system. The chip system includes a processor, and may further include a memory. The chip system is configured to implement the method according to the first aspect or any possible design of the first aspect. The chip system may include a chip, or may include a chip and another discrete component.

According to a sixth aspect, an embodiment of this application provides a communications system. The communications system includes the communications apparatus according to the second aspect.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In the description of this application, unless otherwise indicated, "a plurality of" means two or more.

The following explains the terms that occur or may occur in this application:

1. "At least one" means one or more, that is, including one, two, three or more.

2. "Carrying" may mean that a message is used to carry specific information or data, or may mean that a specific message includes specific information.

The following describes in detail the embodiments of this application with reference to the accompanying drawings. First, a communications system provided in an embodiment of this application is described. The communications system may be configured to perform a method for establishing a Bluetooth data channel provided in an embodiment of this application. Then, a specific implementation of the method for establishing a Bluetooth data channel provided in the embodiment of this application is described. Finally, a communications apparatus provided in an embodiment of this application is described.

The communications system provided in the embodiment of this application may include at least two Bluetooth communications apparatuses. The Bluetooth communications apparatus herein may execute a BLE service (such as a BLE-based audio service) and/or transmit BLE service data based on a Bluetooth-related protocol.

The following describes the embodiments of this application by using the BLE service as an audio service. However, it should not be understood as that the BLE service in this application includes only the audio service. The BLE service may further include a video service or another type of service, and these services may have a plurality of different modes. A mode of the BLE service may be related to quality of Bluetooth data of the BLE service. For example, BLE services such as the audio service and the video service may be classified based on high quality (such as high sound quality or high picture quality), medium quality (such as medium sound quality or medium picture quality), and low quality (such as low sound quality or low picture quality). Each type of the BLE service corresponds to a different mode. In each mode, a parameter based on which a data channel is established between the Bluetooth communications apparatuses may be different, and different data channels are used to transmit Bluetooth data of BLE services in different modes.

Figure 1:
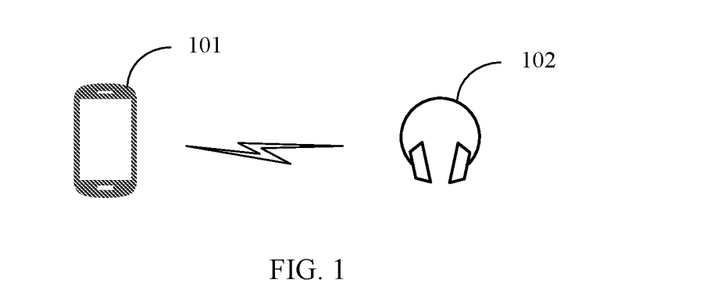
FIG. 1 is a schematic architectural diagram of a communications system to which an embodiment of this application is applicable.

For example, as shown in FIG. 1, a wireless communications system 100 provided in an embodiment of this application may include a first Bluetooth communications apparatus 101 and a second Bluetooth communications apparatus 102. The first Bluetooth communications apparatus 101 and the second Bluetooth communications apparatus 102 include but are not limited to an intelligent terminal that has a Bluetooth function such as a smartphone, a notebook computer, or a tablet computer, or a playback apparatus such as a headset, a sounder, or a vehicle-mounted playback device. The intelligent terminal is usually used as an initiating device of a BLE service. The intelligent terminal starts an audio service and sends BLE service data to a receiving device of the BLE service. The playback apparatus is usually used as a receiving device of the audio service. The apparatus may receive Bluetooth data that is of the audio service and that is provided by an initiating device of the audio service, and play audio to a user based on the Bluetooth data. However, that the audio service may be started by the playback apparatus is not excluded in this application. For example, the user may start the audio service through an operation on a Bluetooth headset. To describe more clearly a method for establishing a Bluetooth data channel provided in this application, an example in which the first Bluetooth communications apparatus 101 is a smartphone and the second Bluetooth communications apparatus 102 is the Bluetooth headset is used below for further detailed description. However, it should not be understood as that: In the method for establishing a Bluetooth data channel in this application, the smartphone or the like needs to be used as the initiating device of the BLE service to perform a step of sending a first message. It should not be understood as that: The Bluetooth headset or the like needs to be used as the receiving device of the BLE service to receive the first message in this application. To be specific, when the method for establishing a Bluetooth data channel provided in this application is performed, the smartphone and the Bluetooth headset may be interchanged to perform the foregoing steps.

Figure 2:
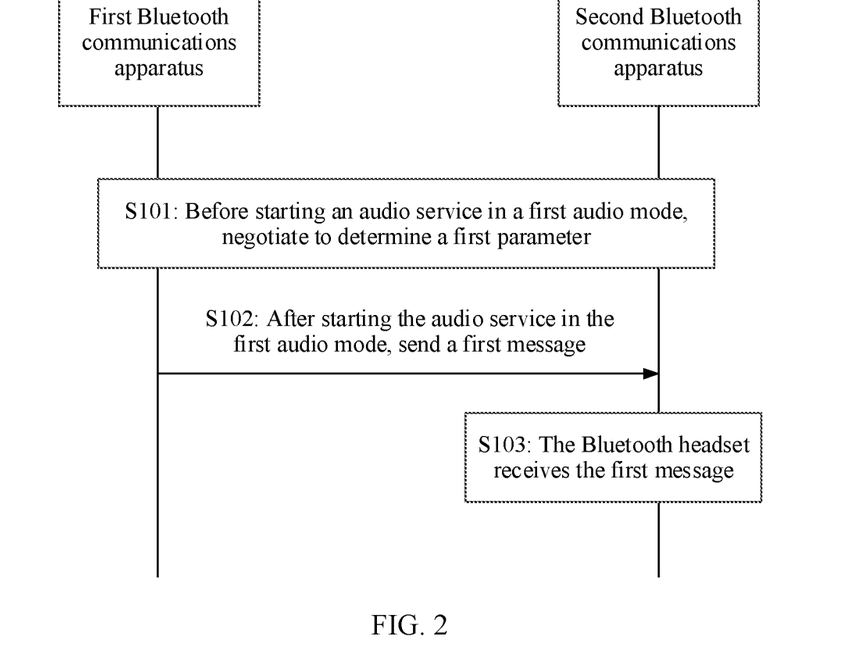
FIG. 2 is a schematic flowchart of a method for establishing a Bluetooth data channel according to an embodiment of this application.

FIG. 2 is a flowchart of a method for establishing a Bluetooth data channel according to an embodiment of this application. In FIG. 2, an example in which a first Bluetooth communications apparatus 101 is a smartphone and a second Bluetooth communications apparatus 102 is a Bluetooth headset is used to describe in detail the method for establishing a Bluetooth data channel provided in the embodiment of this application. The method may include the following steps.

S101: Before starting a service in a first mode, the smartphone negotiates with the Bluetooth headset to determine a first parameter, where the first parameter is used for establishing a data channel between the smartphone and the Bluetooth headset, and the data channel is used to transmit Bluetooth data of the first mode.

For example, the first mode may be one mode, and the first parameter is used for establishing a data channel for Bluetooth data transmission in the mode. To be specific, the first parameter corresponds to the mode. Specifically, the first mode may be one of the following modes: a high-quality music mode, a normal-quality music mode, or a voice mode. Specifically, the data channel may be an ISO channel, and the first parameter may be a CIS parameter of the ISO channel.

S101 needs to be performed before the smartphone starts the service in the first mode.

S102: After starting the service in the first mode, the smartphone sends a first message to the Bluetooth headset, where the first message is used to request the Bluetooth headset to establish the data channel based on the first parameter determined through negotiation. For example, the step shown in S102 may be performed in a process in which the smartphone establishes a Bluetooth connection to the Bluetooth headset.

S103: The Bluetooth headset receives the first message sent by the smartphone. Then, according to the first message, the Bluetooth headset and the smartphone may establish the data channel based on the first parameter pre-determined through negotiation, and then the Bluetooth data of the first mode is transmitted between the Bluetooth headset and the smartphone through the established data channel. For example, through the data channel, the Bluetooth headset may receive Bluetooth data transmitted by an intelligent terminal, and then the Bluetooth headset may play the received Bluetooth data.

According to the foregoing method, before starting the service in the first mode, the smartphone may negotiate with the Bluetooth headset to determine the first parameter, so that after starting the service, the smartphone can request, based on the first parameter pre-determined through negotiation, the Bluetooth headset to establish the data channel. Therefore, time consumed between starting the service and requesting to establish the data channel may be reduced, to decrease a service delay.

For example, the service in the step shown in FIG. 2 may be an audio service, and the first mode may be a first audio mode. Therefore, by using the foregoing method, a delay between starting the audio service and establishing a data channel used to transmit Bluetooth audio data can be decreased. Specifically, an audio mode may be related to quality of Bluetooth data of the audio service. For example, the first mode may include any one of the high-quality music mode, the normal-quality music mode, or the voice mode. Likewise, the service above may alternatively be a video service or another type of service.

When negotiating with the Bluetooth headset to determine the first parameter, the smartphone may send a second message to the Bluetooth headset. The second message is used to request to negotiate a parameter used when the Bluetooth data of the first mode is transmitted between the smartphone and the Bluetooth headset. For example, the second message may be used to indicate at least one candidate parameter. Therefore, after receiving the second message, the Bluetooth headset may select, from the at least one candidate parameter, an appropriate parameter (specifically, using as the first parameter) to establish the data channel. Then, the smartphone may receive a third message fed back by the Bluetooth headset, and the third message may be used by the smartphone to determine the first parameter.

A more specific negotiation process may be as follows: The second message sent by the smartphone to the Bluetooth headset may carry a candidate parameter. If determining that the candidate parameter may be used as a parameter corresponding to the first mode, the Bluetooth headset may indicate, by using the third message, that the candidate parameter is agreed to be used as the parameter corresponding to the first mode. For example, the Bluetooth headset may agree, by using a specific value of a specific bit in the third message, to use the candidate parameter as the parameter corresponding to the first mode.

It should be understood that the following should also not be excluded in this application: The at least one candidate parameter indicated by the second message does not include the appropriate parameter that is applicable to establishing the data channel between the smartphone and the Bluetooth headset. Alternatively, the second message does not include any candidate parameter, and the Bluetooth headset needs to be requested to indicate an available parameter. In this case, the Bluetooth headset may indicate, by using the third message, a new parameter as the first parameter.

In an optional implementation, the foregoing process of determining the first parameter through negotiation between the smartphone and the Bluetooth headset may start at a moment when the Bluetooth connection is established between the smartphone and the Bluetooth headset.

In implementation, the second message may be a link layer CIS request (LL_CIS_REQ) message. The third message may be a link layer CIS response (LL_CIS_RSP) message.

In a possible implementation, a plurality of other groups of parameters may be further determined through negotiation between the smartphone and the Bluetooth headset by using the step shown in S101. Different groups of parameters may be used for establishing transmission channels for transmitting Bluetooth data of different modes.

Specifically, the audio service is used as an example. The second message may further be used to request to negotiate an audio parameter used when Bluetooth audio data in a second audio mode is transmitted between the smartphone and the Bluetooth headset, and/or to request to negotiate an audio parameter used when Bluetooth audio data in a third audio mode is transmitted between the smartphone and the Bluetooth headset. The third message may further be used to determine a second parameter, where the second parameter is used to determine a transmission channel that needs to be established for transmitting the Bluetooth audio data in the second audio mode between the smartphone and the Bluetooth headset, and/or the third message is further used to determine a third parameter, where the third parameter is used to determine a transmission channel that needs to be established for transmitting the Bluetooth audio data in the third audio mode between the smartphone and the Bluetooth headset.

In addition, the smartphone may send a second message, to request to negotiate with the Bluetooth headset to determine a plurality of groups of parameters. The different groups of parameters may be used for establishing the transmission channels for transmitting the Bluetooth data of different modes. The audio service is used as an example. The smartphone may send a second message to request, through negotiation with the Bluetooth headset, to determine audio parameters respectively corresponding to three audio modes: the high-quality music mode, the normal-quality music mode, and the voice mode. In addition, the Bluetooth headset sends a third message to indicate the audio parameters respectively corresponding to the three audio modes, so that the smartphone and the Bluetooth headset may perform, by using the second message and the third message, a negotiation process of the audio parameters respectively corresponding to the three audio modes. Compared with a current procedure in which only an audio parameter corresponding to one audio mode is negotiated in each interaction (each interaction includes two handshake processes), this procedure can reduce a quantity of interactions required for negotiating the audio parameters respectively corresponding to the three audio modes, to decrease a delay generated in a parameter negotiation process.

In a possible implementation, the first message, the second message, and the third message each in this application may be a link layer (LL) message. The message is sent by using a link layer of a communications apparatus, and the message may be a link layer link discovery protocol (LLCP) message or a logical link control and adaptation protocol (L2CAP) message. For example, if the second message is the L2CAP message, the message can carry more bits of information than the LLCP message currently used for parameter negotiation (the parameter is used for establishing a Bluetooth data channel) between Bluetooth communications apparatuses. Therefore, the second message may be used to request to negotiate parameters respectively corresponding to a plurality of modes. For example, the second message carries a candidate parameter corresponding to each mode. This makes it possible to negotiate, by using one second message, the parameters respectively corresponding to the plurality of modes. In addition, the third message may also be an L2CAP message.

In the implementation of the step shown in S102, the smartphone may send the first message after determining to start the service in the first mode. The audio service is used as an example. Starting an audio service in the first audio mode may refer to that the smartphone switches from never playing the audio service to starting to play the audio service in the first audio mode, or that the smartphone switches from playing an audio service in an audio mode other than the first audio mode to playing the audio service in the first audio mode. For example, the first audio mode is the high-quality music mode. The smartphone may send the first message after determining that the user triggers audio playing in the high-quality music mode by performing an operation on the smartphone. Alternatively, the smartphone may send the first message after determining that the user switches, by performing an operation on the smartphone, the played music in the normal-quality music mode to the played music in the high-quality music mode.

For example, the first message in this application may be a link layer CIS indication (LL_CIS_IND) message. The message may be used to request to establish a CIS channel. Specifically, the message sent by the smartphone may carry information used to indicate a parameter (such as the first parameter), so that the Bluetooth headset may determine, based on the information, a parameter based on which the smartphone requests to establish the CIS channel. In addition, the message may carry information used to indicate a service, so that the Bluetooth headset may determine, based on the information, which type of service is started by the smartphone (for example, the information is used to indicate a type of the audio service), to establish a corresponding CIS channel based on a parameter corresponding to the service.

Figure 3A:
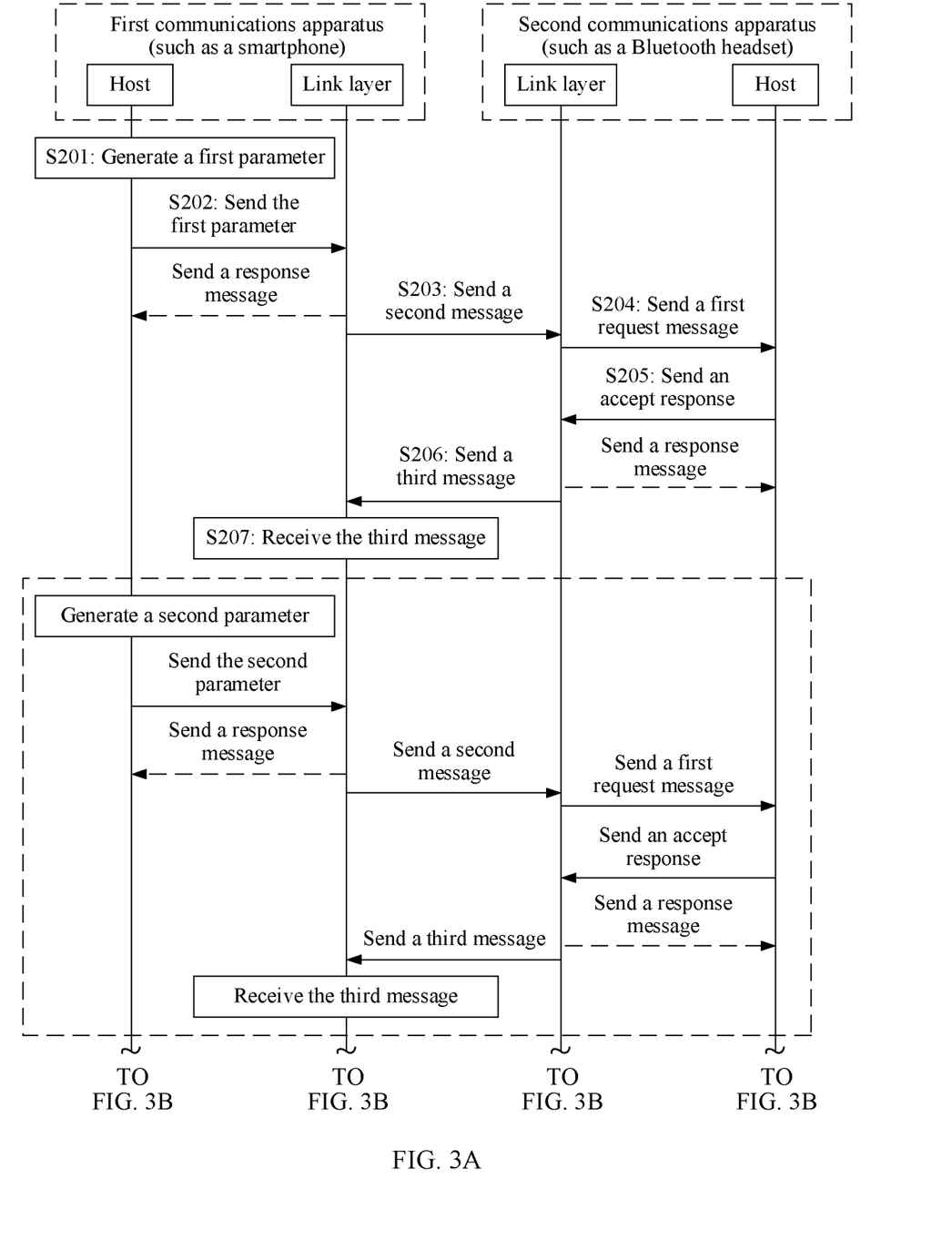
FIG. 3A and FIG. 3B are a schematic flowchart of another method for establishing a Bluetooth data channel according to an embodiment of this application.
Figure 3B:
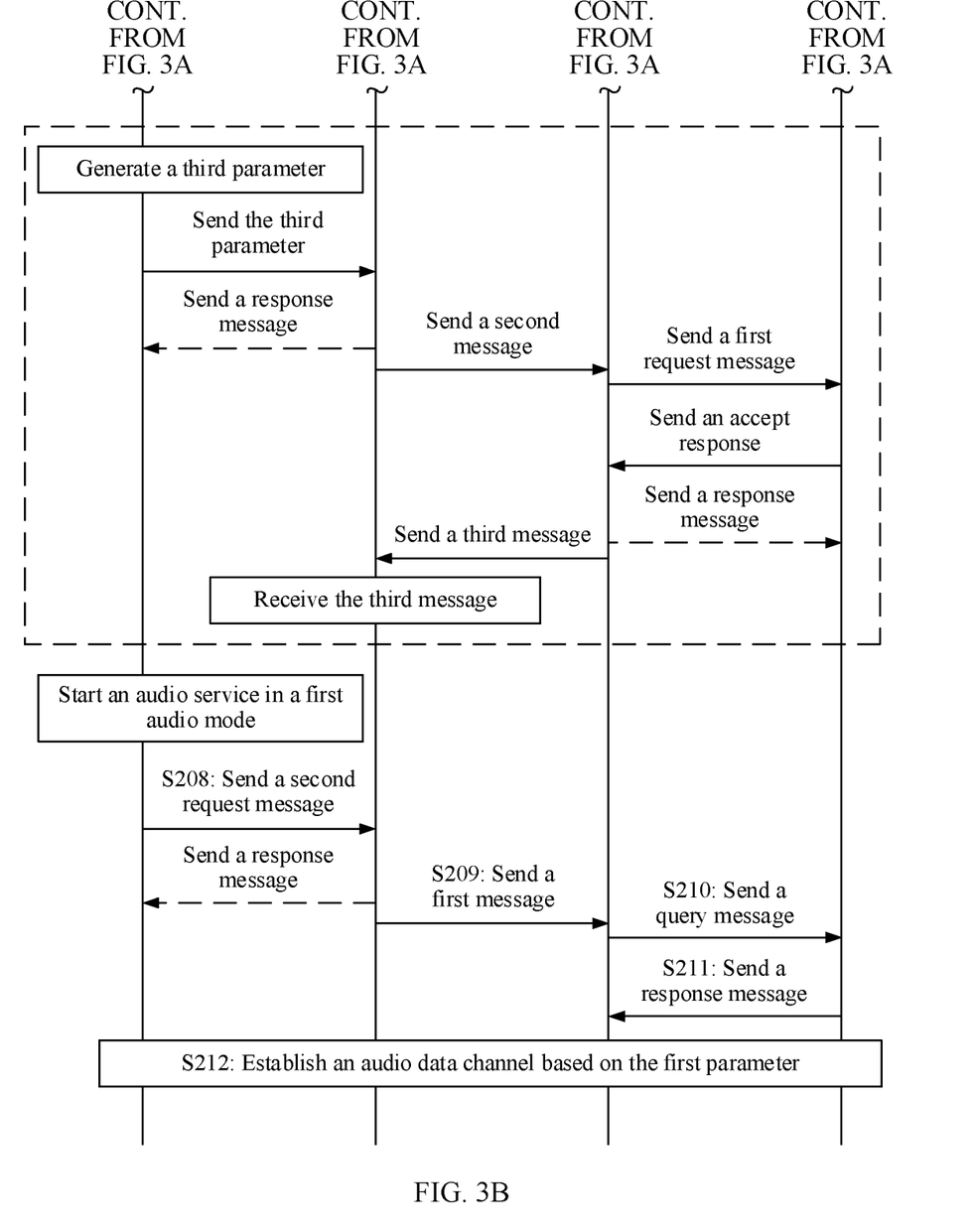

With reference to FIG. 3A and FIG. 3B, an example in which a second message and a third message are link layer messages is used in the following to further describe a method for establishing a Bluetooth data channel provided in an embodiment of this application. A first communications apparatus and a second communications apparatus may be the foregoing smartphone and Bluetooth headset respectively, or may be the foregoing Bluetooth headset and smartphone respectively. Information and/or a parameter may be configured for the first communications apparatus and the second communications apparatus by using a host, and the communications apparatus may send and/or receive a link layer message through a link layer (which may also be referred to as a control layer) based on the information and/or the parameter configured by using the host. For example, the information may be configured for the first communications apparatus and the second communications apparatus by using the host, and the first communications apparatus and the second communications apparatus send the information through the link layer. In this application, functions of the host and the link layer may be implemented by software. As shown in FIG. 3A and FIG. 3B, an audio service is used as an example. The method includes the following steps.

S201: A host of a smartphone generates a first parameter, where the first parameter is used for establishing an audio data channel for transmitting Bluetooth audio data in a first audio mode.

S202: The host of the smartphone sends the first parameter to a link layer, so that the link layer sends the second message to the Bluetooth headset.

S203: The link layer of the smartphone generates and sends the second message to a link layer of the Bluetooth headset, where the second message includes the first parameter, and is used to request the Bluetooth headset to determine whether the first parameter included in the second message may be used as a parameter for establishing the audio data channel. The audio data channel is used by the smartphone and the Bluetooth headset to transmit the Bluetooth audio data in the first audio mode. The link layer of the smartphone may further send a response message to the host of the smartphone after receiving the first parameter. In implementation, the second message in S203 may be the link layer message, for example, an LLCP message or an L2CAP message.

S204: The link layer of the Bluetooth headset receives the second message, and sends a first request message to a host of the Bluetooth headset, where the first request message is used to indicate the first parameter and is used to query the host of the Bluetooth headset whether the first parameter may be used as the parameter for establishing the audio data channel.

S205: If determining that the first parameter included in the second message may be used as the parameter for establishing the audio data channel, the host of the Bluetooth headset sends an accept response to the link layer of the Bluetooth headset, to indicate that the first parameter may be used as the parameter for establishing the audio data channel.

S206: The link layer of the Bluetooth headset sends the third message to the link layer of the smartphone based on the accept response, to indicate that the Bluetooth headset agrees to use the first parameter as the parameter for establishing the audio data channel. After the link layer of the Bluetooth headset receives the accept response, the host of the Bluetooth headset may further send a response message to indicate that the accept response is received.

S207: The link layer of the smartphone receives the third message.

S208: After an audio service in the first audio mode is started, the host of the smartphone sends a second request message to the link layer, where the second request message is used to indicate that the smartphone starts the audio service in the first audio mode. Starting the audio service in the first audio mode may refer to that the smartphone switches from never playing the audio service to starting to play the audio service in the first audio mode, or that the smartphone switches from playing an audio service in an audio mode other than the first audio mode to playing the audio service in the first audio mode.

S209: The link layer of the smartphone sends a first message to the link layer of the Bluetooth headset based on the second request message sent by the host, where the first message is used to request to establish the audio data channel based on the first parameter, and the audio data channel is used by the smartphone and the Bluetooth headset to transmit the Bluetooth audio data in the first audio mode. The first message may include the first parameter, or information used to indicate the first parameter, such as an identifier, a number, and the like of the first parameter. The first message may further carry information used to indicate the first audio mode, such as an identifier of the audio mode. The link layer of the smartphone may further send a response message to the host after receiving the request message. The first message herein may be an LL_CIS_IND message.

S210: After receiving the first message, the link layer of the Bluetooth headset sends a query request to the host of the Bluetooth headset, to query whether the audio data channel may be established based on the first parameter.

S211: The link layer of the Bluetooth headset receives a response message sent by the host of the Bluetooth headset, where the response message may indicate that the host agrees to establish the audio data channel based on the first parameter.

S212: Establish the audio data channel between the Bluetooth headset and the smartphone based on the first parameter.

In implementation, before the audio service in the first audio mode is started, the Bluetooth headset may further negotiate with the smartphone to determine a second parameter and a third parameter with reference to the steps shown in S201 to S207. The second parameter is used for establishing an audio data channel for transmitting Bluetooth audio data in a second audio mode, and the third parameter is used for establishing an audio data channel for transmitting Bluetooth audio data in a third audio mode.

For example, the step shown in S201 may be performed after a Bluetooth connection is established between the smartphone and the Bluetooth headset.

It should be understood that before the step shown in S208, the smartphone and the Bluetooth headset may further negotiate an audio parameter corresponding to an audio mode other than the first audio mode. A negotiation manner is not specifically limited in this application, and reference may be made to the steps shown in S201 to S207.

According to the foregoing procedure, before starting the audio service in the first audio mode, the smartphone may negotiate with the Bluetooth headset to determine the first parameter corresponding to the first audio mode. In this way, after the audio service in the first audio mode is started, the smartphone and the Bluetooth headset may directly establish the audio data channel based on the first parameter determined through negotiation, to implement transmission of the Bluetooth audio data in the first audio mode. Therefore, a transmission delay of Bluetooth audio data caused when the audio service in the first mode is started may be decreased, to decrease a BLE audio service delay. Likewise, after an audio service in the second audio mode is started, the smartphone and the Bluetooth headset may also directly establish an audio data channel based on the second parameter determined through negotiation, to implement transmission of the Bluetooth audio data in the second audio mode. In addition, after an audio service in the third audio mode is started, the smartphone and the Bluetooth headset may also directly establish an audio data channel based on the third parameter determined through negotiation, to implement transmission of the Bluetooth audio data in the third audio mode. Likewise, the foregoing process shown in FIG. 3A and FIG. 3B may be further used to establish a Bluetooth data channel for a video service or another service.

Figure 4:
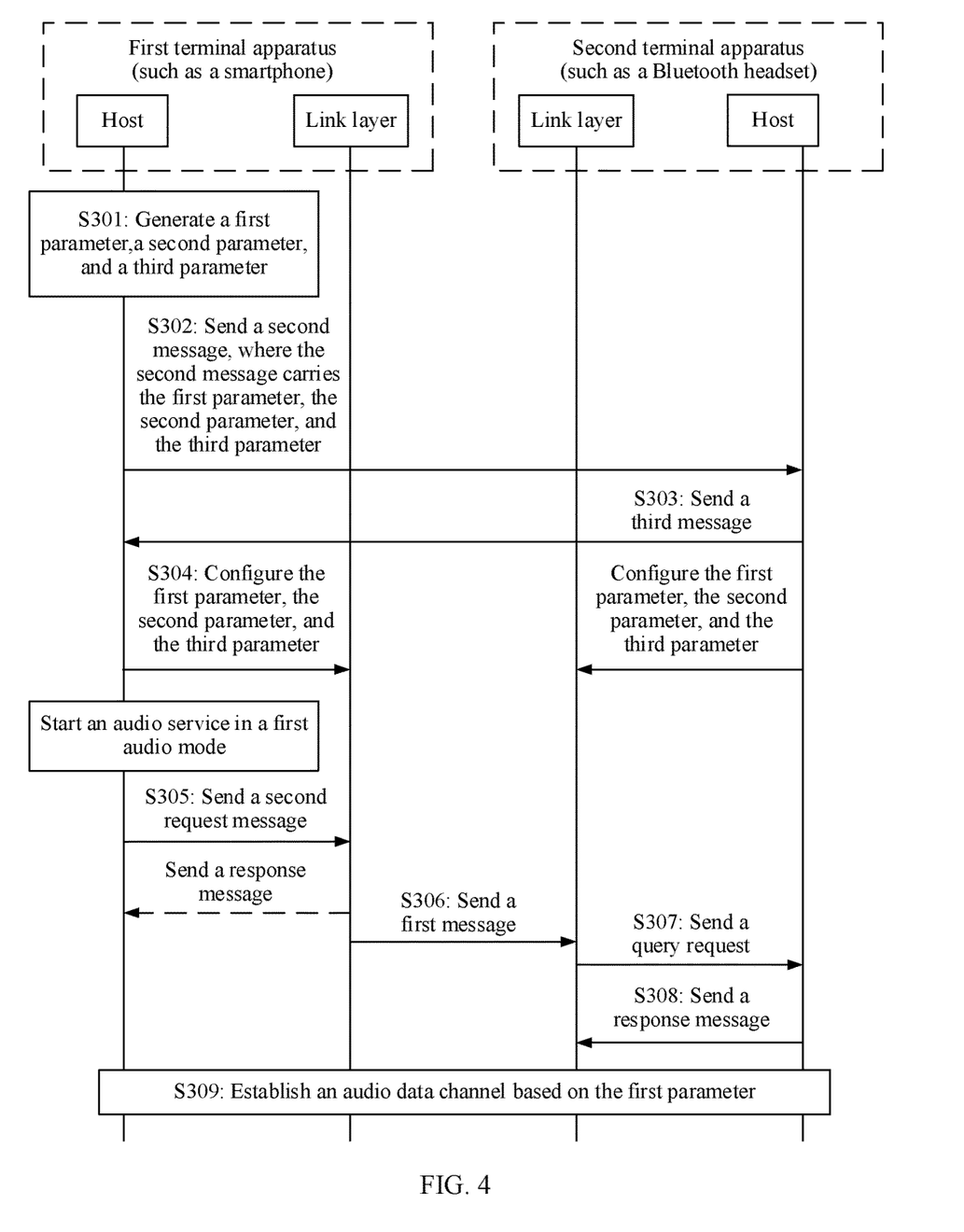
FIG. 4 is a schematic flowchart of another method for establishing a Bluetooth data channel according to an embodiment of this application.

The following describes, by using an example in which a plurality of parameters respectively corresponding to a plurality of modes are negotiated, a procedure of negotiating the parameters respectively corresponding to the plurality of modes and establishing a Bluetooth data channel based on a second message in a method for establishing a Bluetooth data channel provided in this application. As shown in FIG. 4, an audio service is used as an example. The method for establishing a Bluetooth data channel provided in an embodiment of this application may include the following steps.

S301: A host of a smartphone generates a first parameter, a second parameter, and a third parameter, where the first parameter is used for establishing an audio data channel for transmitting Bluetooth audio data in a first audio mode, the second parameter is used for establishing an audio data channel for transmitting Bluetooth audio data in a second audio mode, and the third parameter is used for establishing an audio data channel for transmitting Bluetooth audio data in a third audio mode.

S302: The host of the smartphone sends a second message to a host of a Bluetooth headset, where the second message carries the first parameter, the second parameter, and the third parameter, and the second message may be an L2CAP message. The second message is used to query the Bluetooth headset whether the first parameter may be used as an audio parameter for establishing the audio data channel in the first audio mode, whether the second parameter may be used as an audio parameter for establishing the audio data channel in the second audio mode, and whether the third parameter may be used as an audio parameter for establishing the audio data channel in the third audio mode.

S303: If determining that the first parameter may be used as the audio parameter for establishing the audio data channel in the first audio mode, the second parameter may be used as the audio parameter for establishing the audio data channel in the second audio mode, and the third parameter may be used as the audio parameter for establishing the audio data channel in the third audio mode, the host of the Bluetooth headset sends a third message to the host of the smartphone, to indicate a result of the foregoing determining. In addition, the host of the Bluetooth headset may further send the first parameter, the second parameter, and the third parameter to a link layer of the Bluetooth headset, so that the first parameter, the second parameter, and the third parameter are configured for the link layer of the Bluetooth headset.

S304: After the host of the smartphone receives the third message, the first parameter, the second parameter, and the third parameter may be configured for a link layer of the smartphone.

S305: After an audio service in the first audio mode is started, the host of the smartphone sends a request message to the link layer, where the request message is used to indicate starting the audio service in the first audio mode. Starting the audio service in the first audio mode may refer to that the smartphone switches from never playing the audio service to starting to play the audio service in the first audio mode, or that the smartphone switches from playing an audio service in an audio mode other than the first audio mode to playing the audio service in the first audio mode.

S306: The link layer of the smartphone sends a first message to the link layer of the Bluetooth headset based on the request message sent by the host, where the first message is used to request to establish the audio data channel based on the first parameter, and the audio data channel is used by the smartphone and the Bluetooth headset to transmit the Bluetooth audio data in the first audio mode. The first message may include the first parameter, or information used to indicate the first parameter, such as an identifier, a number, and the like of the first parameter. The first message may further carry information used to indicate the first audio mode, such as an identifier of the audio mode. The link layer of the smartphone may further send a response message to the host after receiving the request message.

S307: After receiving the first message, the link layer of the Bluetooth headset sends a query request to the host of the Bluetooth headset, to query whether the audio data channel may be established based on the first parameter.

S308: The link layer of the Bluetooth headset receives a response message sent by the host of the Bluetooth headset, where the response message may indicate that the host agrees to establish the audio data channel based on the first parameter.

S309: Establish the audio data channel between the Bluetooth headset and the smartphone based on the first parameter.

For example, the step shown in S301 may be performed after a Bluetooth connection between the smartphone and the Bluetooth headset is established.

According to the foregoing procedure, before starting the audio service in the first audio mode, the smartphone negotiates with the Bluetooth headset to determine the first parameter corresponding to the first audio mode, the second parameter corresponding to the second audio mode, and the third parameter corresponding to the third audio mode. Therefore, after the audio service in the first audio mode is started, the smartphone and the Bluetooth headset may directly establish the audio data channel based on the first parameter determined through negotiation, to implement transmission of the Bluetooth audio data in the first audio mode, to decrease a BLE audio service delay. Likewise, after an audio service in the second audio mode is started, the smartphone and the Bluetooth headset may also directly establish an audio data channel based on the second parameter determined through negotiation, to implement transmission of the Bluetooth audio data in the second audio mode. In addition, after an audio service in the third audio mode is started, the smartphone and the Bluetooth headset may directly establish an audio data channel based on the third parameter determined through negotiation, to implement transmission of the Bluetooth audio data in the third audio mode. Likewise, the foregoing process shown in FIG. 4 may be further used to establish a Bluetooth data channel for a video service or another service.

Based on a same technical concept as that in the foregoing method embodiments, an embodiment of this application further provides a communications apparatus. The communications apparatus may be configured to implement a function performed by a first communications apparatus (such as a smartphone) and/or a second communications apparatus (such as a Bluetooth headset) in the foregoing method embodiments.

Figure 5:
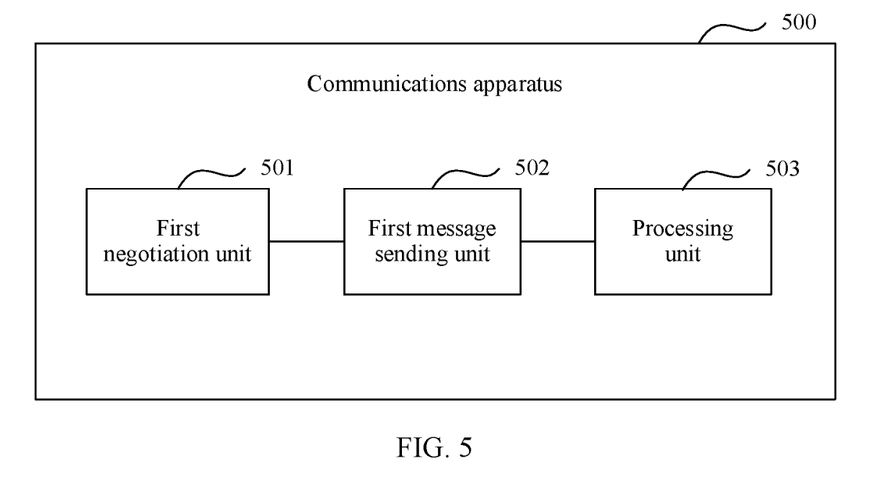
FIG. 5 is a schematic structural diagram of a communications apparatus according to an embodiment of this application.

As shown in FIG. 5, an embodiment of this application further provides a communications apparatus 500, configured to perform an operation performed by the first communications apparatus in the method for establishing a Bluetooth data channel. The communications apparatus 500 may include a first negotiation unit 501 and a first message sending unit 502. In addition, the communications apparatus 500 may further include a processing unit 503.

In implementation, the first negotiation unit 501 may be configured to: before a first communications apparatus starts a service in a first mode, negotiate with a second communications apparatus to determine a first parameter. The first parameter may be used for establishing a data channel between a first communications apparatus and the second communications apparatus, and the data channel is used to transmit Bluetooth data of the first mode. After the first communications apparatus starts the service in the first mode, the first message sending unit 502 may be configured to send a first message to the second communications apparatus. The first message is used to request the second communications apparatus to establish the data channel.

It should be understood that the service above may be an audio service, or may be a video service or another type of service.

When the first parameter is determined through negotiation, the first negotiation unit 501 may send a second message to the second communications apparatus. The second message is used to request to negotiate a parameter used when the Bluetooth data of the first mode is transmitted between the first communications apparatus and the second communications apparatus. The first negotiation unit 501 may further receive a third message sent by the second communications apparatus. The third message is used to determine the first parameter.

For example, the second message may be specifically used to indicate at least one parameter. The at least one parameter includes the first parameter. The third message may be specifically used to indicate that the second communications apparatus agrees to establish the data channel based on the first parameter.

In addition, the second message may further be used to request to negotiate a parameter used when Bluetooth data of a second mode is transmitted between the first communications apparatus and the second communications apparatus, and the third message may further be used to determine a second parameter. The second parameter is used for transmitting the Bluetooth data of the second mode between the first communications apparatus and the second communications apparatus. Specifically, the second message may further be used to indicate the at least one parameter. The at least one parameter includes the second parameter. The third message is specifically used to indicate that the second communications apparatus agrees to establish the data channel based on the second parameter.

The second message may further be used to request to negotiate a parameter used when Bluetooth data of a third mode is transmitted between the first communications apparatus and the second communications apparatus, and the third message may further be used to determine a third parameter. The third parameter is used for transmitting the Bluetooth data of the third mode between the first communications apparatus and the second communications apparatus. Specifically, the second message may further be used to indicate the at least one parameter. The at least one parameter includes the third parameter. The third message is specifically used to indicate that the second communications apparatus agrees to establish the data channel based on the third parameter.

In implementation, the second message may be an L2CAP message. In this design, the first communications apparatus may negotiate with the second communications apparatus by using the L2CAP message to determine a parameter used when Bluetooth data of one or more modes is transmitted. In implementation, the third message may also be an L2CAP message.

The first mode may be any one of a high-quality music mode, a normal-quality music mode, or a voice mode. In addition, the first mode, the second mode, and the third mode each may be one of the high-quality music mode, the normal-quality music mode, or the voice mode.

For example, the service in the first mode may be the audio service. Specifically, the first mode may be any one of the high-quality music mode, the normal-quality music mode, or the voice mode. In addition, the first mode, the second mode, and the third mode each in this application may be one of the high-quality music mode, the normal-quality music mode, or the voice mode.

In addition, the processing unit 503 may be used for configuring information and a parameter that are required when the first negotiation unit 501 and the first message sending unit 502 send a message.

It should be understood that, corresponding functions of the first negotiation unit 501 and the first message sending unit 502 may be implemented by a link layer of the first communications apparatus. A function of the processing unit 503 may be implemented by a host of the first communications apparatus. In addition, based on a limitation of a specific implementation condition of the communications apparatus 500, the first negotiation unit 501, the first message sending unit 502, and the processing unit 503 may be independent of each other, or may be partially integrated or integrated as a whole. This is not specifically limited in this application.

Figure 6:
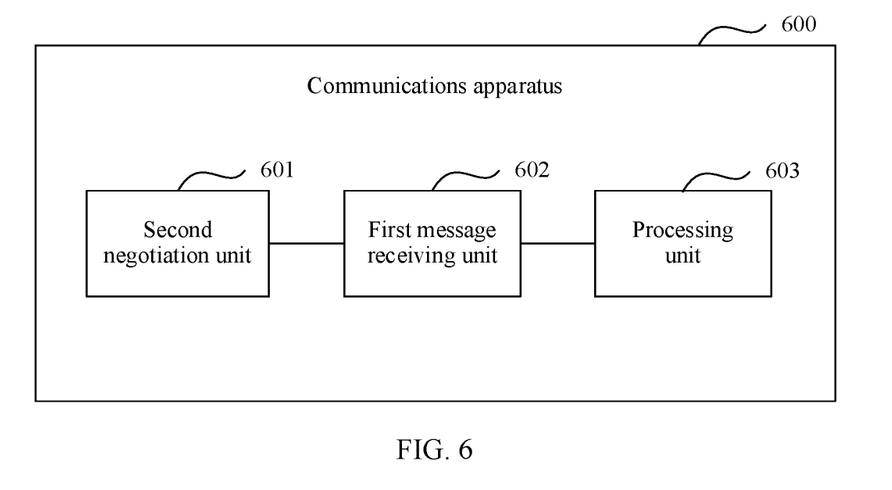
FIG. 6 is a schematic structural diagram of another communications apparatus according to an embodiment of this application.

As shown in FIG. 6, an embodiment of this application further provides a communications apparatus 600, configured to perform an operation performed by the second communications apparatus in the method for establishing a Bluetooth data channel. The communications apparatus 600 may include a second negotiation unit 601 and a first message receiving unit 602. In addition, the communications apparatus 600 may further include a processing unit 603.

In implementation, before a first communications apparatus starts a service in a first mode, the second negotiation unit 601 may negotiate with a first communications apparatus to determine a first parameter. The first parameter may be used for establishing a data channel between the first communications apparatus and a second communications apparatus, and the data channel is used to transmit Bluetooth data of the first mode. After the first communications apparatus starts the service in the first mode, the first message receiving unit 602 may receive a first message from the first communications apparatus. The first message is used to request the second communications apparatus to establish the data channel.

It should be understood that the service above may be an audio service, or may be a video service or another type of service.

For example, when the second communications apparatus negotiates with the first communications apparatus to determine the first parameter, the second negotiation unit 601 may receive a second message from the first communications apparatus. The second message is used to request to negotiate a parameter used when the Bluetooth data of the first mode is transmitted between the first communications apparatus and the second communications apparatus. Then, the second negotiation unit 601 may send a third message to the first communications apparatus. The third message is used to determine the first parameter.

For example, the second message may be specifically used to indicate at least one parameter. The at least one parameter includes the first parameter. The third message may be specifically used to indicate that the second communications apparatus agrees to establish the data channel based on the first parameter.

In addition, the second message may further be used to request to negotiate a parameter used when Bluetooth data of a second mode is transmitted between the first communications apparatus and the second communications apparatus, and the third message may further be used to determine a second parameter. The second parameter is used for transmitting the Bluetooth data of the second mode between the first communications apparatus and the second communications apparatus. Specifically, the second message may further be used to indicate the at least one parameter. The at least one parameter includes the second parameter. The third message is specifically used to indicate that the second communications apparatus agrees to establish the data channel based on the second parameter.

The second message may further be used to request to negotiate a parameter used when Bluetooth data of a third mode is transmitted between the first communications apparatus and the second communications apparatus, and the third message may further be used to determine a third parameter. The third parameter is used for transmitting the Bluetooth data of the third mode between the first communications apparatus and the second communications apparatus. Specifically, the second message may further be used to indicate the at least one parameter. The at least one parameter includes the third parameter. The third message is specifically used to indicate that the second communications apparatus agrees to establish the data channel based on the third parameter.

In implementation, the second message may be an L2CAP message. In this design, the first communications apparatus may negotiate with the second communications apparatus by using the L2CAP message to determine a parameter used when Bluetooth data of one or more modes is transmitted. In implementation, the third message may also be an L2CAP message.

For example, the service in the first mode may be the audio service. Specifically, the first mode may be any one of a high-quality music mode, a normal-quality music mode, or a voice mode. In addition, the first mode, the second mode, and the third mode each may be one of the high-quality music mode, the normal-quality music mode, or the voice mode.

In addition, the processing unit 603 may be used for configuring information and a parameter that are required when the second negotiation unit 601 and the first message receiving unit 602 send a message.

It should be understood that, corresponding functions of the second negotiation unit 601 and the first message receiving unit 602 may be implemented by a link layer of the second communications apparatus. A function of the processing unit 603 may be implemented by a host of the second communications apparatus. In addition, based on a limitation of a specific implementation condition of the communications apparatus 600, the second negotiation unit 601, the first message receiving unit 602, and the processing unit 603 may be independent of each other, or may be partially integrated or integrated as a whole. This is not specifically limited in this application.

In the foregoing embodiments, units of the communications apparatus 500 shown in FIG. 5 and units of the communications apparatus 600 shown in FIG. 6 may be separated from each other, or may be partially integrated or integrated as a whole. Specifically, the communications apparatus 500 shown in FIG. 5 and the communications apparatus 600 shown in FIG. 6 may be implemented by integrating units into an integrated chip.

Figure 7:
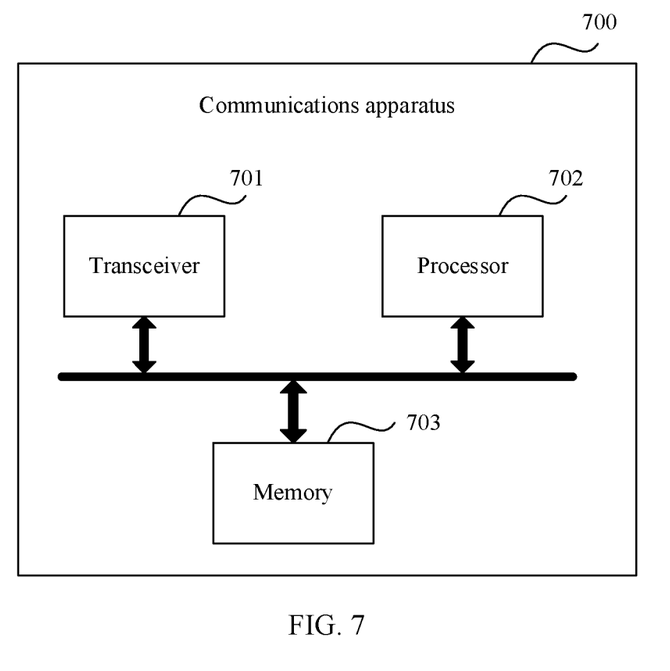
FIG. 7 is a schematic structural diagram of another communications apparatus according to an embodiment of this application.

As shown in FIG. 7, an embodiment of this application further provides a communications apparatus 700, configured to perform an operation performed by the first communications apparatus and/or the second communications apparatus in the method for establishing a Bluetooth data channel. The communications apparatus 700 may include a transceiver 701, a processor 702, and a memory 703.

Specifically, the transceiver 701 may be a wireless transceiver, and may be configured to support the communications apparatus 700 to receive and send signaling and data by using Bluetooth and/or a wireless air interface. Alternatively, the transceiver 701 may be a wired communications interface, for example, a wire interface such as an optical fiber communications interface or a copper wire. The memory 703 may be configured to store program instructions and data. The processor 702 may be used by the communications apparatus 700 to invoke and execute the program instruction in the memory 703. When a program is executed, the processor 702 is enabled to perform an operation performed by the first communications apparatus and/or the second communications apparatus in the method provided in the foregoing embodiments. The transceiver 701, the processor 702, and the memory 703 may be connected by using a bus structure or another connection medium.

When an operation performed by the first communications apparatus is implemented, the transceiver 701 may be configured to implement corresponding functions of the first negotiation unit 501 and the first message sending unit 502 that are of the communications apparatus 500 shown in FIG. 5. The processor 702 may be configured to perform a corresponding function of the processing unit 503.

Specifically, the transceiver 701 may be configured to: before the first communications apparatus starts a service in a first mode, negotiate with the second communications apparatus to determine a first parameter. The first parameter may be used for establishing a data channel between a first communications apparatus and the second communications apparatus, and the data channel is used to transmit Bluetooth data of the first mode. After the first communications apparatus starts the service in the first mode, the transceiver 701 may be configured to send a first message to the second communications apparatus. The first message is used to request the second communications apparatus to establish the data channel.

It should be understood that the service above may be an audio service, or may be a video service or another type of service.

When the first parameter is determined through negotiation, the transceiver 701 may send a second message to the second communications apparatus. The second message is used to request to negotiate a parameter used when the Bluetooth data of the first mode is transmitted between the first communications apparatus and the second communications apparatus. The transceiver 701 may further receive a third message sent by the second communications apparatus. The third message is used to determine the first parameter.

When an operation performed by a second communications apparatus is implemented, the transceiver 701 may be configured to implement corresponding functions of the second negotiation unit 601 and the first message receiving unit 602 that are of the communications apparatus 600 shown in FIG. 6. The processor 702 may perform and implement a corresponding function of the processing unit 603.

Specifically, when the operation performed by the second communications apparatus is implemented, the transceiver 701 may be configured to: before the first communications apparatus starts the service in the first mode, negotiate with the first communications apparatus to determine the first parameter. The first parameter may be used for establishing the data channel between the first communications apparatus and the second communications apparatus, and the data channel is used to transmit the Bluetooth data of the first mode. After the first communications apparatus starts the service in the first mode, the transceiver 701 may receive the first message from the first communications apparatus. The first message is used to request the second communications apparatus to establish the data channel.

When the second communications apparatus negotiates with the first communications apparatus to determine the first parameter, the transceiver 701 may receive the second message from the first communications apparatus. The second message is used to request to negotiate a parameter used when the Bluetooth data of the first mode is transmitted between the first communications apparatus and the second communications apparatus. Then, the transceiver 701 may send the third message to the first communications apparatus. The third message is used to determine the first parameter.

The second message may further be used to request to negotiate a parameter used when Bluetooth data of a second mode is transmitted between the first communications apparatus and the second communications apparatus, and the third message may further be used to determine a second parameter. The second parameter is used for transmitting the Bluetooth data of the second mode between the first communications apparatus and the second communications apparatus. Specifically, the second message may further be used to indicate at least one parameter. The at least one parameter includes the second parameter. The third message is specifically used to indicate that the second communications apparatus agrees to establish the data channel based on the second parameter.

In addition, the second message may further be used to request to negotiate a parameter used when Bluetooth data of a third mode is transmitted between the first communications apparatus and the second communications apparatus, and the third message may further be used to determine a third parameter. The third parameter is used for transmitting the Bluetooth data of the third mode between the first communications apparatus and the second communications apparatus. Specifically, the second message may further be used to indicate the at least one parameter. The at least one parameter includes the third parameter. The third message is specifically used to indicate that the second communications apparatus agrees to establish the data channel based on the third parameter.

In implementation, the second message may be an L2CAP message. In this design, the first communications apparatus may negotiate with the second communications apparatus by using the L2CAP message to determine a parameter used when Bluetooth data of one or more modes is transmitted. In implementation, the third message may also be an L2CAP message.

For example, the service in the first mode may be the audio service. Specifically, the first mode may be any one of a high-quality music mode, a normal-quality music mode, or a voice mode. In addition, the first mode, the second mode, and the third mode each may be one of the high-quality music mode, the normal-quality music mode, or the voice mode.

It may be understood that FIG. 7 is merely a schematic diagram, and this application does not limit that the communications apparatus further includes another necessary component not shown in FIG. 7.

Based on a same concept as the foregoing method embodiments, an embodiment of this application further provides a computer-readable storage medium. The computer-readable storage medium stores a computer program. When the program is executed by a processor, the computer is enabled to perform an operation performed by the first communications apparatus and/or the second communications apparatus in the method embodiments or any possible implementation of the method embodiments.

Based on a same concept as the foregoing method embodiments, this application further provides a computer program product. When the computer program product is invoked and executed by a computer, the computer may be enabled to implement an operation performed by the first communications apparatus and/or the second communications apparatus in the method embodiments or any possible implementation of the method embodiments.

Based on a same concept as the foregoing method embodiments, this application further provides a chip or a chip system. The chip is coupled to a transceiver, and is configured to implement an operation performed by the first communications apparatus and/or the second communications apparatus in the method embodiments or any possible implementation of the method embodiments. "Coupling" means that two components are directly or indirectly connected to each other. This connection may be fixed or movable, and may allow a fluid, electricity, an electrical signal, or another type of signal to transport between the two components. The chip system may include the chip. Specifically, the chip or the chip system may be configured to perform a step performed by the first communications apparatus and/or the second communications apparatus provided in the embodiments of this application.

Based on a same concept as the foregoing method embodiments, this application further provides a communications system. The communications system may be configured to implement an operation performed by the first communications apparatus and/or the second communications apparatus in the method embodiments or any possible implementation of the method embodiments. For example, the communications system has a structure shown in FIG. 1.

The embodiments of this application are described with reference to the flowcharts and/or block diagrams of the method, the apparatus, and the computer program product according to the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

These computer program instructions may also be stored in a computer-readable memory that can instruct the computer or the another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

These computer program instructions may also be loaded onto the computer or the another programmable data processing device, so that a series of operations and steps are performed on the computer or the another programmable device, thereby generating computer-implemented processing. Therefore, the instructions executed on the computer or the another programmable device provide steps for implementing the specific function in one or more processes in the flowcharts and/or in one or more blocks in the block diagrams.

What is claimed is:

1. A method for establishing a Bluetooth data channel, comprising:
    before starting a service in a first mode, negotiating, by a first communications apparatus, with a second communications apparatus to determine a first parameter, wherein the first parameter is used for establishing a data channel between the first communications apparatus and the second communications apparatus, and the data channel is used to transmit Bluetooth data of the first mode; and
    after starting the service in the first mode, sending, by the first communications apparatus, a first message to the second communications apparatus, wherein the first message includes the first parameter and is used to request the second communications apparatus to establish the data channel based on the first parameter;
    wherein the negotiating, by the first communications apparatus, with the second communications apparatus to determine the first parameter comprises:
    sending, by the first communications apparatus, a second message to the second communications apparatus, wherein the second message is used to request to negotiate a parameter to be used when the Bluetooth data of the first mode is transmitted between the first communications apparatus and the second communications apparatus; and
    receiving, by the first communications apparatus, a third message sent by the second communications apparatus, wherein the third message is used to determine the first parameter.

2. The method according to claim 1, wherein the second message includes at least one parameter, the at least one parameter comprises the first parameter, and the third message is used to indicate that the second communications apparatus agrees to establish the data channel based on the first parameter.

3. The method according to claim 1, wherein the second message is further used to request to negotiate a parameter to be used when Bluetooth data of a second mode is transmitted between the first communications apparatus and the second communications apparatus, and the third message is further used to determine a second parameter, wherein the second parameter is used for transmitting the Bluetooth data of the second mode between the first communications apparatus and the second communications apparatus.

4. The method according to claim 3, wherein the second message is further used to request to negotiate a parameter to be used when Bluetooth data of a third mode is transmitted between the first communications apparatus and the second communications apparatus, and the third message is further used to determine a third parameter, wherein the third parameter is used for transmitting the Bluetooth data of the third mode between the first communications apparatus and the second communications apparatus.

5. The method according to claim 1, wherein the second message is a logical link control and adaptation protocol (L2CAP) message.

6. The method according to claim 1, wherein the first mode is any one of the following modes:
   a high-quality music mode;
   a normal-quality music mode; or
   a voice mode.

7. A first communications apparatus for establishing a Bluetooth data channel, comprising:
   a first negotiation circuit, configured to: before the first communications apparatus starts a service in a first mode, negotiate with a second communications apparatus to determine a first parameter, wherein the first parameter is used for establishing a data channel between the first communications apparatus and the second communications apparatus, and the data channel is used to transmit Bluetooth data of the first mode; and
   a first message sending circuit, configured to: after the first communications apparatus starts the service in the first mode, send a first message to the second communications apparatus, wherein the first message is used to request the second communications apparatus to establish the data channel based on the first parameter;

wherein the first negotiation circuit is further configured to:
   send a second message to the second communications apparatus, wherein the second message is used to request to negotiate a parameter to be used when the Bluetooth data of the first mode is transmitted between the first communications apparatus and the second communications apparatus; and
   receive a third message sent by the second communications apparatus, wherein the third message is used to determine the first parameter.

8. The first communications apparatus according to claim 7, wherein the second message is used to indicate at least one parameter, the at least one parameter comprises the first parameter, and the third message is used to indicate that the second communications apparatus agrees to establish the data channel based on the first parameter.

9. The first communications apparatus according to claim 7, wherein the second message is further used to request to negotiate a parameter to be used when Bluetooth data of a second mode is transmitted between the first communications apparatus and the second communications apparatus, and the third message is further used to determine a second parameter, wherein the second parameter is used for transmitting the Bluetooth data of the second mode between the first communications apparatus and the second communications apparatus.

10. The first communications apparatus according to claim 9, wherein the second message is further used to request to negotiate a parameter to be used when Bluetooth data of a third mode is transmitted between the first communications apparatus and the second communications apparatus, and the third message is further used to determine a third parameter, wherein the third parameter is used for transmitting the Bluetooth data of the third mode between the first communications apparatus and the second communications apparatus.

11. The first communications apparatus according to claim 7, wherein the second message is an L2CAP message.

12. The first communications apparatus according to claim 7, wherein the first mode is any one of the following modes:
   a high-quality music mode;
   a normal-quality music mode; or
   a voice mode.

* * * * *